United States Patent [19]
Martin

[11] 4,095,609
[45] Jun. 20, 1978

[54] ROLL-OVER VALVE FOR MOTOR VEHICLES

[75] Inventor: Frank J. Martin, Ann Arbor, Mich.

[73] Assignee: Chrysler Corporation, Highland Park, Mich.

[21] Appl. No.: 727,080

[22] Filed: Sep. 27, 1976

[51] Int. Cl.² ............................................ F16K 17/36
[52] U.S. Cl. ..................................................... 137/43
[58] Field of Search ............................. 137/38, 39, 43

[56] References Cited

U.S. PATENT DOCUMENTS

| | | | |
|---|---|---|---|
| 1,683,338 | 9/1928 | Evinrude | 137/43 |
| 2,396,233 | 3/1946 | Abrams | 137/43 X |
| 3,996,951 | 12/1976 | Parr | 137/43 |

Primary Examiner—Robert G. Nilson
Attorney, Agent, or Firm—Baldwin & Newtson

[57] ABSTRACT

A roll-over valve utilizing a caged ball for positionally responsive actuation.

11 Claims, 6 Drawing Figures

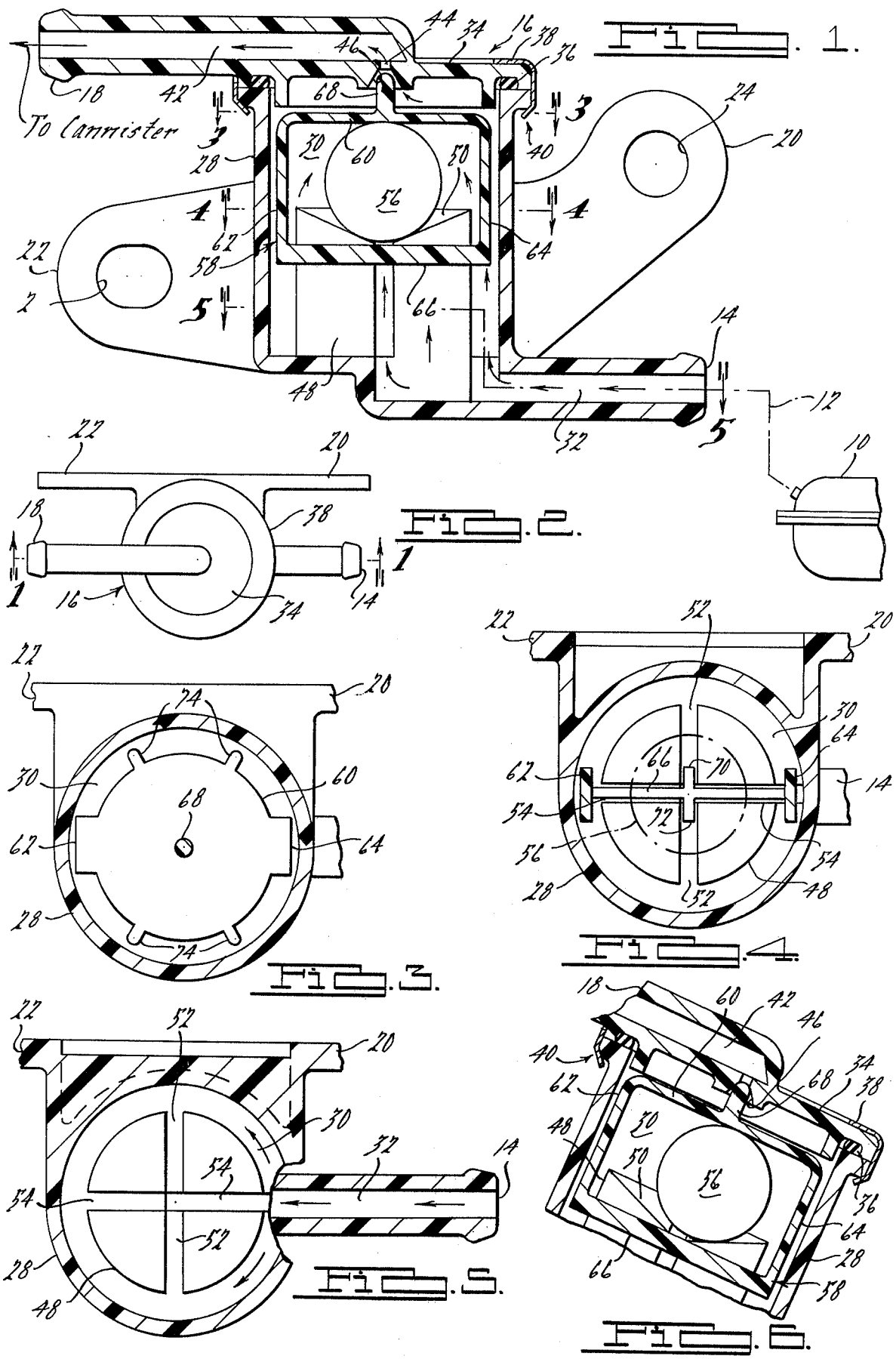

ROLL-OVER VALVE FOR MOTOR VEHICLES

BACKGROUND OF THE INVENTION

In order to minimize the evaporative loss of fuel to the atmosphere from motor vehicle gasoline tanks, a vent line is typically attached to the tank for directing fuel vapors to storage containers such as charcoal cannisters and/or to the engine such as to the fuel-air intake manifold. Such vent lines may be susceptible to fuel leakage from the fuel tank in the event of an accidental roll-over of the automobile or even when the automobile is tilted to an extreme angle such as may occur if a motor vehicle runs off the road over an embankment or into a ditch. Fuel leakage from the fuel tank vent line is to be avoided if possible. Thus, it has become common to include a positionally sensitive roll-over valve in the vent line to close it when the automobile has been titled in excess of a predetermined angle or has rolled over and is upside down. The closed valve prevents leakage of fuel from the tank through the vent lines and thus minimizes the possibility of a fire hazzard which may result therefrom.

An object of this invention is to provide an improved roll-over valve which reacts positively both to open itself and to close itself when its position is changed.

SUMMARY OF THE INVENTION

In its preferred embodiment, as described in more detail below, the roll-over valve provided by this invention includes a heavy ball resting on a conical seat inside a valve body chamber which includes inlet means and an upper outlet means disposed immediately above the ball. A movable cage encloses the ball between upper and lower members so as to move with it as the valve is inclined from an upright position and the ball tends to roll up the conical surface on which it rests thus moving the cage upwardly. The top of the cage is adapted to close the outlet opening when this occurs. When the valve is returned to its normal upright position and the ball returns to its center seat, the ball urges the cage by pressing its bottom downwardly in the valve chamber thus positively opening the outlet.

Thus, when the vehicle carrying the valve is inclined to an angle which is considered abnormal such as one in which liquid fuel from the fuel tank may enter the vent line and leak therethrough, the ball rides on the conical surface and displaces the cage until valve member 68 closes opening 44 by seating on seat 46. In this manner leakage of fuel through the vent line is avoided.

The positional response of the valve and the ball may be adjusted to roll the base at any various predetermined angles or changes in attitude depending on the angular design of the conical seat, the size of the ball and its weight, among other things.

The invention is not limited in its application to the details of construction and arrangement of parts illustrated hereinbelow since the invention is capable of other embodiments and of being practiced and carried out in various ways. Also, it should be understood that the terminolgy employed herein is for the purpose of description and not for the purpose of limitation.

BRIEF DESCRIPTION OF THE DRAWINGS

FIG. 1 is a vertical section of the roll-over valve taken along line 1—1 of FIG. 2 showing it in its upright "open" position and schematically showing its connection into the vent line of a fuel tank.

FIG. 2 is a top elevational view of the exterior of the device.

FIG. 3 is a sectional view of the valve taken along line 3—3 in FIG. 1;

FIG. 4 is another sectional view of the valve taken along line 4—4 of FIG. 1;

FIG. 5 is another sectional view of the valve taken along line 5—5 of FIG. 1;

FIG. 6 is a fragmentary vertical section of the valve in a tilted or inclined position showing it in a "closed" condition.

DESCRIPTION OF THE PREFERRED EMBOIDMENT

This invention provides an improved roll-over check valve for use in the fuel tank vent line of a motor vehicle between the fuel tank and the utilization means to which the vent line extends, such as a charcoal cannister and/or the engine fuel-air intake manifold, to prevent leakage.

FIG. 1 shows a typical automobile gasoline fuel tank 10 having a vent line schematically indicated at 12 to which the inlet 14 of the roll-over valve 16 of the invention is attached and through which fuel vapor may be vented from the upper outlet 18 of valve 16 to an engine carburetor, engine crankcase, a cannister vapor storage means or any other utilization means as is indicated in the Figure.

FIG. 1 shows the roll-over vlave of the invention in the upright and open position as it would be mounted in the fuel tank vent line of a motor vehicle corresponding to the normal operating attitude of the motor vehicle.

Attachment to the motor vehicle may be accomplished by means of integral bracket portions or extensions 20 and 22 which include mounting holes 24 and 26.

Roll-over valve 16 comprises a valve body which may be formed by a generally cylindrical body portion 28 defining a valve chamber 30 with which the integral passage 32 communicates to allow the entrance of fuel vapors from the fuel tank vent line 12 into valve chamber 30 as indicated by the arrows in FIGS. 1 and 5. The valve body also includes a top closure member 34 which seals cylindrical portion 28 and closes valve chamber 30. Closure member 34 may include a rubber or elastomeric O-ring seal 36 as shown and may be held in sealing relationship with cylindrical body portion 28 of the valve body by means of the centrally apertured metal cap 38 which fits around the circumference of closure member 34 overlapping to the top thereof as shown in the Figures and which is crimped tightly under an upper edge of cylindrical portion 28 as indicated at 40 in FIG. 1. Closure member 34 may include the integral outlet 18 which forms an outlet passage 42 and which communicates with valve chamber 30 by means of opening 44 which is preferably centrally located in closure member 34 at the top of the valve body as shown. Opening 34 also includes and/or forms an interior seat portion 46 by means of which opening 44 may be closed as shown in FIG. 6 and as described hereinbelow.

Chamber 30 includes a raised seat portion 48 which terminates at its upper end in a conical surface 50. Raised seat 48 is preferably cylindrical as shown in the Figures and is spaced interiorly from the side walls of the valve body cylindrical portion 28. Raised portion 48 is situated thusly for two purposes. First, it allows space for vapors to enter the valve body through passage 32 and flow upwardly into the valve chamber toward outlet opening 44. Secondly, it positions the raised seat directly beneath opening 44 for actuation or closing purposes. Raised seat 48 is shown divided into four sections by two slots 52 and 54 which extend across the raised portion 48 and downwardly into it. Slot 54 communicates with passage 32 as can be seen from the Figures thus providing additional space via the slots for the upward movement of fuel vapors entering the valve chambers from passage 32.

A heavy ball such as steel ball 56 rests on conical surface 50 in a freely movable condition so as to be movable upon tilting or inclination of valve 16 from the upright position shown in FIG. 1 to an inclined position such as that shown in FIG. 6 to allow ball 56 to roll upwardly on the inclined surface of conical seat surface 50 and to return to its centered rest or normal position as shown in FIG. 1 upon return of the valve body 16 to its upright position. Valve 16 also includes a cage member generally designated 58 which encloses ball 56 by means of a flat planar top member 60, flat rectangular side members 62 and 64, and a bottom cross member 66. As shown, top member 60 is disposed below outlet opening 44 and includes an upwardly projecting valve element or valve closure member 68 disposed to seat on seat 46 as shown in FIG. 6 thus closing the valve against the passage of vapors. Cage 58 is arranged in valve chamber 30 for reciporcable movement or up and downward movement therein jointly with movement of ball 56 on conical surface 50. To this end, bottom cross member 66 is disposed below ball 56 in slot 54 for vertical reciprocable member therein as the entire cage moves. Preferably cross member 66 takes the form of a rail disposed edgewise in the slot. The length of side members 62 and 64 is selected to space top member 60 and bottom cross member 66 a distance from each other which will be at least on the order of the diameter of ball 56 to allow for the position of the ball within cage 58 and to provide contact between top member 60 and ball 56 when the ball moves upwardly on conical surface 50 and to provide contact between bottom cross member 66 and ball 56 when the ball rolls downwardly on concial surface 50 thereby providing position movement by ball 56 of the cage 58 in both the upwardly and downwardly directions in the valve chamber 30. It can readily be seen that upward movement of cage 58 by the urging of ball 56 upon inclination results in seating of the valve member 68 in opening 44 at seat 46 thus closing the valve to the passage of fuel vapors therethrough. Closure, of course, occurs only when the valve is inclined in excess of a predetermined angle which may be selected as desired or when the valve is turned completely upside down. Closure is shown in FIG. 6. Upon return of the valve to the upright position ball 56 rolls to its rest or normal position in the center of conical surface 50 thus bearing against bottom cross member 66 and moving cage 58 downwardly in valve chamber 30 to positively open the valve.

The valve body portion 28 including the covered seat and inlet integral therewith, the top closure member 34 and cage member 58 may all be molded from a plastic material e.g., DuPont Dalrin 100.

Additional bottom cross members may be included on cage 58 along with additional slots in raised portion 48 for receiving them. Also, a cross member may include additional guide abutment portions such as extensions 70 and 72, as shown in FIG. 4, which are slidably received in slot 54 and serve as additional guide means for the reciprocal movement of cage 58 in chamber 30.

Also, members 62 and 64 may be positioned outwardly of top member 60 slightly to serve as centering means in chamber 30 of the cage as shown in FIG. 3. Additional centering means such as projections 74 are also included on top member 60 as shown in FIG. 3. However, the projections 74 may be unnecessary in certain other embodiments.

In the event the motor vehicle is rolled completely over, of course, ball 56 will bear against top member 60 and may no longer be seated on conical surface 50. Such operation is considered to be within the purview of the operation of this invention in the context of "inclination" and/or "tilting". From the foregoing, it is seen that a roll-over valve is provided by the invention in which both closing and opening are positively caused by the positionally sensitive ball 56.

Having described a preferred embodiment of the inventon, the exclusive property rights which are claimed are defined as follows.

What is claimed is:

1. A valve device comprising a valve body adapted for mounting in a substantially upright position in a motor vehicle, the valve body defining a valve chamber and including:

an upper outlet communicating with the valve chamber;

an inlet communicating with the valve chamber;

a raised seat disposed in the valve chamber below the outlet and including an upper concave conical surface portion and at least one slot extending across a portion of the raised seat and downwardly into it;

a freely movable ball resting on the conical surface, the ball being normally positioned at the center of the conical surface when the valve is upright and rolling up the conical surface when the valve is inclined, and a cage for the ball, the cage being arranged for vertical reciprocable movement in the chamber by the ball as it rolls on the conical seat, the cage including a cage top member disposed below the upper outlet and above the ball and adapted to close the outlet upon being moved toward the outlet, at least one bottom cage cross member disposed below the ball and in the seat slot for vertical reciprocal movement therein when the ball rolls up and down the conical surface, and side members extending between the top and bottom cage members for maintaining them in a fixed space relationship at least on the order of the diameter of the ball whereby the ball fits between the top and bottom cage members and urges the cage upwardly by contacting the top member upon inclination of the valve and downwardly by contacting the bottom member upon returning the valve to the upright position to provide both positive closing and positive opening of the valve outlet by the ball.

2. In the valve of claim 1, the cage top member including spacer means for centering the cage in the valve chamber.

3. In the valve of claim 1, the inlet and outlet including respectively, conduit means adapted for connection into a vent line.

4. In the valve of claim 1, the upper outlet including an opening in the top of the valve body with an interior valve seat surrounding the opening.

5. In the valve of claim 4, the cage top member including a valve closure member adapted for sealing in the opening seat.

6. In the valve of claim 5, the closure member comprising an upwardly extending projection on the cage top member.

7. In the valve of claim 1, the raised seat including two slots disposed substantially normal to each other.

8. In the valve of claim 7, the cage bottom cross member being disposed in one slot and including substantially normal projections disposed in the other slot.

9. In the valve of claim 7, the inlet being in communication with at least one of the slots.

10. In the valve of claim 1, the cage including a flat planar top member, a single bottom cross member in the general form of a rail disposed edgewise to the top member, and two flat side members connected at opposite ends of the bottom member and opposite sides of the top member, respectively.

11. In the valve of claim 10, the valve chamber being circular in horizontal cross-section and the cage top member being generally circular and planar in form.

* * * * *